United States Patent

Ikuta et al.

(10) Patent No.: US 10,721,922 B2
(45) Date of Patent: *Jul. 28, 2020

(54) DUAL-BEARING REEL

(71) Applicant: Shimano Inc., Sakai, Osaka (JP)

(72) Inventors: Takeshi Ikuta, Sakai (JP); Akira Nago, Sakai (JP); Shingo Aoki, Sakai (JP); Shunsaku Asaka, Sakai (JP)

(73) Assignee: SHIMANO INC., Sakai, Osaka (JP)

(*) Notice: Subject to any disclaimer, the term of this patent is extended or adjusted under 35 U.S.C. 154(b) by 215 days.

This patent is subject to a terminal disclaimer.

(21) Appl. No.: 15/624,198

(22) Filed: Jun. 15, 2017

(65) Prior Publication Data

US 2018/0064083 A1 Mar. 8, 2018

(30) Foreign Application Priority Data

Sep. 8, 2016 (JP) ................................ 2016-175312

(51) Int. Cl.
*A01K 89/01* (2006.01)
*A01K 89/015* (2006.01)
*A01K 89/0155* (2006.01)

(52) U.S. Cl.
CPC .... *A01K 89/01931* (2015.05); *A01K 89/0155* (2013.01); *A01K 89/0189* (2015.05)

(58) Field of Classification Search
CPC .......... A01K 89/01931; A01K 89/0189; A01K 89/0155
See application file for complete search history.

(56) References Cited

U.S. PATENT DOCUMENTS

| | | | | |
|---|---|---|---|---|
| 4,390,140 A | * | 6/1983 | Karlsson | A01K 89/0155 242/289 |
| 5,875,986 A | * | 3/1999 | Miyazaki | A01K 89/0155 242/261 |
| 5,996,921 A | * | 12/1999 | Hogaki | A01K 89/0155 182/239 |
| 6,053,444 A | * | 4/2000 | Yamaguchi | A01K 89/0193 242/280 |
| 7,377,367 B2 | * | 5/2008 | Takizawa | B62L 3/023 188/344 |
| 7,401,748 B2 | * | 7/2008 | Kitajima | A01K 89/0111 242/306 |
| 9,549,540 B2 | | 1/2017 | Ikuta et al. | |
| 9,668,465 B2 | | 6/2017 | Niitsuma et al. | |
| 9,807,989 B2 | | 11/2017 | Niitsuma et al. | |
| 9,901,084 B2 | * | 2/2018 | Takechi | A01K 89/0188 |
| 2001/0038052 A1 | * | 11/2001 | Oishi | A01K 89/006 242/255 |
| 2016/0345558 A1 | * | 12/2016 | Niitsuma | A01K 89/0155 |
| 2016/0345559 A1 | * | 12/2016 | Ikuta | A01K 89/0187 |
| 2016/0345560 A1 | * | 12/2016 | Niitsuma | A01K 89/0187 |
| 2017/0245484 A1 | * | 8/2017 | Takechi | A01K 89/0188 |

FOREIGN PATENT DOCUMENTS

JP H09275861 A 10/1997

* cited by examiner

*Primary Examiner* — Michael E Gallion
(74) *Attorney, Agent, or Firm* — United IP Counselors, LLC

(57) ABSTRACT

A dual-bearing reel comprises a reel main body, a spool, a spool shaft, an adjusting member, and an operation lever. The adjusting member is attached to the reel main body. The adjusting member adjusts a braking force with which a rotation of the spool shaft is braked. The operation lever is attached to the adjusting member such that the operation lever extends in a radial direction.

14 Claims, 9 Drawing Sheets

DUAL-BEARING REEL

CROSS-REFERENCE TO RELATED APPLICATION

This application claims priority to Japanese Patent Application No. 2016-175312 filed on Sep. 8, 2016, the entirety of which is hereby incorporated by reference in its entirety.

BACKGROUND

Technical Field

The present disclosure relates to a dual-bearing reel.

Background Art

A dual-bearing reel generally comprises a casting-control mechanism. The casting-control mechanism is a mechanism that brakes the rotation of a spool shaft by applying a frictional force to the spool shaft. Thereby, the rotational speed of the spool shaft when the line is being reeled out is reduced, and thereby backlash is prevented.

In the dual-bearing reel described in Japanese Unexamined Patent Application Publication No. H9-275861, an operation lever is pivotably attached to a reel main body to make the operation of the casting-control mechanism easy. The braking force applied to the spool shaft can be adjusted by pivoting the operation lever in a circumferential direction.

BRIEF SUMMARY

For the dual-bearing reel described above, there is a demand for an operation lever that is more easier to operate. Accordingly, an object of the present invention is to provide a dual-bearing reel that comprises an operation lever that is easier to operate.

A dual-bearing reel according to one aspect of the present invention comprises: a first reel body portion, a second reel body portion, a spool, a spool shaft, an adjusting member, and an operation lever. The second reel body portion is disposed spaced apart from the first reel body portion in an axial direction. The spool is disposed between the first reel body portion and the second reel body portion. The spool shaft rotates integrally with the spool. The adjusting member is attached to the first reel body portion. In addition, the adjusting member is configured to adjust a braking force with which the rotation of the spool shaft is braked. The operation lever comprises an lever body portion that extends from the adjusting member in the radial direction and extends toward the second reel body portion.

According to this configuration, the lever body portion extends not only in the radial direction but also extends toward the second reel body portion. Consequently, the operation lever can be operated from the second reel body portion side by the hand that holds the dual-bearing reel. That is, the operation lever can be operated not only by the hand that operates the handle but also by the hand on the opposite side. Thus, the lever body portion of the dual-bearing reel according to the present invention extends as far as the second reel body portion side, such that the hand reaches, from the second reel body portion side, the operation lever in the state in which the hand holds the dual-bearing reel. Accordingly, the operation lever of the dual-bearing reel according to the present disclosure is easier to operate.

The lever body portion is preferably pivotably attached to the adjusting member in the axial direction. According to this configuration, by pivoting the lever body portion, the position of the lever body portion can be adjusted, such that it is easy to operate by the hand on the side opposite the hand that operates the handle.

The operation lever preferably further comprises a mounting part detachably attached to the adjusting member.

The operation lever preferably further comprises a hinge part that couples the lever body portion and the mounting part such that the lever body portion is pivotably attached to the adjusting member in the axial direction.

The mounting part preferably comprises a first tubular part. Furthermore, the adjusting member preferably comprises a second tubular part that fits in the first tubular part.

The mounting part preferably comprises an inner-side flange part that extends from the first tubular part toward the inner side and makes contact with the adjusting member in the axial direction. According to this configuration, the mounting part and the adjusting member can be positioned in the axial direction by the inner-side flange part.

The adjusting member further preferably comprises an outer-side flange part that extends from the second tubular part toward the outer side. Furthermore, the first tubular part preferably makes contact with the outer-side flange part in the axial direction. According to this configuration, the mounting part and the adjusting member can be positioned in the axial direction by the outer-side flange part.

A tip part of the lever body portion preferably overlaps, in a radial-direction view, an outermost-circumferential surface of the first reel body portion centered about the spool shaft.

The lever body portion preferably meanders or curves toward the second reel body portion.

The lever body portion preferably comprises a base-end part and an operation part. The base-end part extends from the adjusting member in the radial direction. The operation part extends from a tip part of the base-end part toward the second reel body portion in the axial direction.

The operation part preferably is disposed on the outer side of the first reel body portion in the radial direction.

The base-end part can extend in a stepped shape in the radial direction and the axial direction.

The base-end part can be tilted toward the second reel body portion side and extend in the radial direction.

According to the present disclosure, a dual-bearing reel comprising an operation lever that is easier to operate can be provided.

DETAILED DESCRIPTION

Embodiments of a dual-bearing reel according to the present invention are explained below, with reference to the drawings. It is noted that an axial direction indicates the direction in which a spool shaft extends. In addition, a radial direction indicates the radial direction of a circle centered about the spool shaft, and a circumferential direction indicates the circumferential direction of a circle centered about the spool shaft.

[Dual-Bearing Reel]

Figure 1:
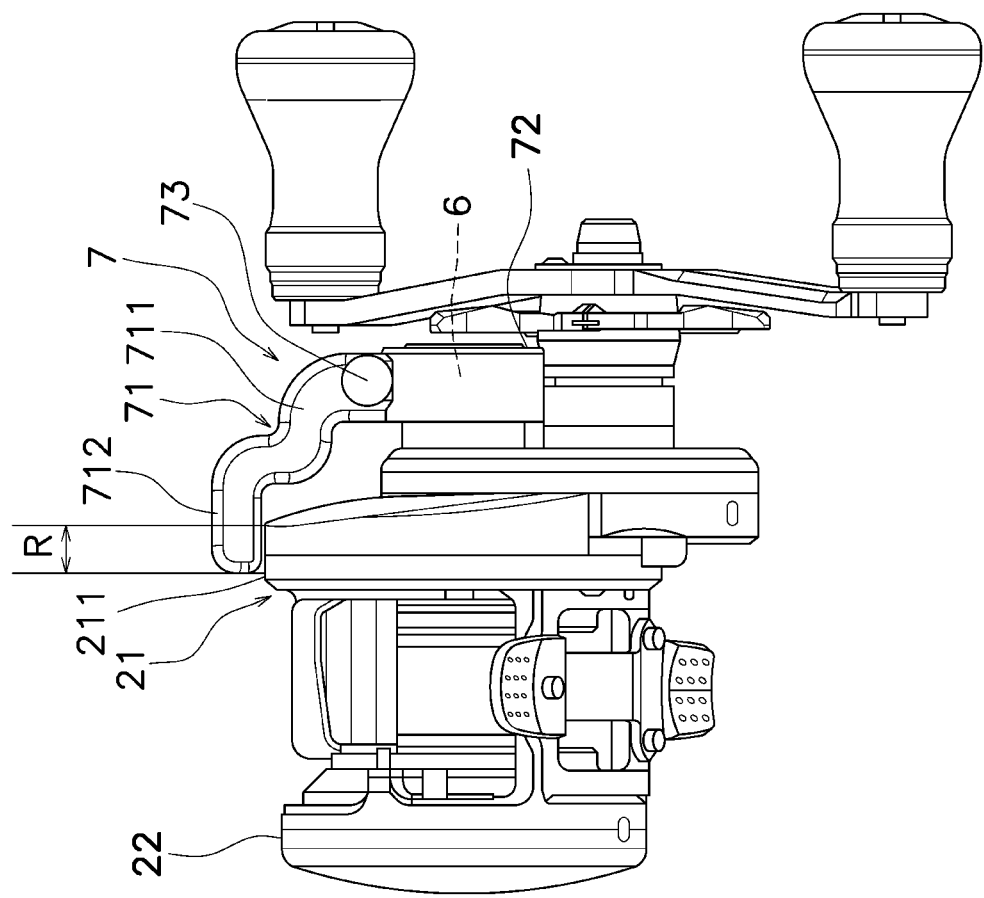
FIG. 1 is a front view of a dual-bearing reel.
Figure 2:
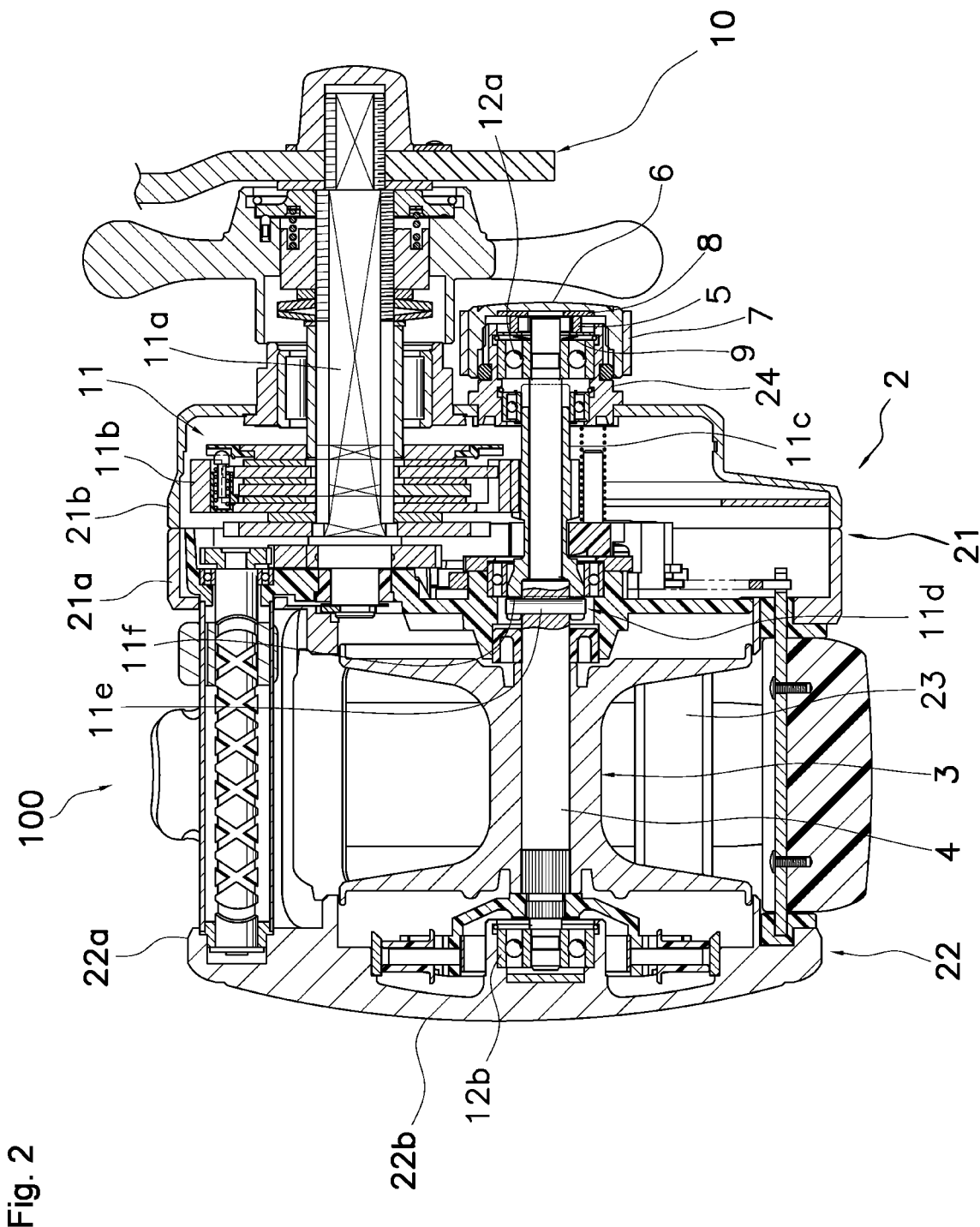
FIG. 2 is a cross-sectional view of the dual-bearing reel.

As shown in FIG. 1 and FIG. 2, a dual-bearing reel 100 comprises a reel main body 2, a spool 3, a spool shaft 4, a one-way clutch 5, an adjusting member 6, and an operation lever 7. In addition, the dual-bearing reel 100 further comprises a first friction plate 8, a biasing member 9, and a handle 10.

[Reel Main Body]

The reel main body 2 comprises a first reel body portion 21 and a second reel body portion 22. The first reel body portion 21 and the second reel body portion 22 are disposed spaced apart from one another in the axial direction. The first reel body portion 21 and the second reel body portion 22 are coupled to one another via a plurality of coupling parts 23.

As shown in FIG. 2, the first reel body portion 21 comprises a first side plate 21a and a first cover 21b. The interior of the first reel body portion 21 has a housing space. A rotation-transmitting mechanism 11 and the like are housed inside the housing space. The second reel body portion 22 comprises a second side plate 22a and a second cover 22b. The first side plate 21a and the second side plate 22a are coupled to one another via the coupling parts 23. The first side plate 21a, the second side plate 22a, and the coupling parts 23 are integrally formed and constitute a frame of the reel main body 2.

The first reel body portion 21 further comprises a protruding part 24. The protruding part 24 has a cylindrical shape and protrudes toward the outer side in the axial direction. In detail, the protruding part 24 protrudes from the first cover 21b toward the outer side in the axial direction. A screw thread is formed on an outer-circumferential surface of the protruding part 24. The adjusting member 6 is attached to the protruding part 24. In detail, the adjusting member 6 is screwed onto the protruding part 24. The protruding part 24 communicates with the housing space and the exterior of the first reel body portion 21. Inside the protruding part 24, one end part of the spool shaft 4 is rotatably supported.

[Spool]

The spool 3 is rotatably disposed between the first reel body portion 21 and the second reel body portion 22. In detail, the spool 3 substantially has a cylindrical shape and extends in the axial direction. The spool 3 is rotatable with respect to the reel main body 2. The spool 3 is rotatably supported by the reel main body 2 via the spool shaft 4.

[Spool Shaft]

The spool shaft 4 rotates integrally with the spool 3. The spool shaft 4 is rotatably supported by the first reel body portion 21 and the second reel body portion 22. It is noted that the spool shaft 4 is rotatably supported by the first reel body portion 21 and the second reel body portion 22 via first and second bearing members 12a, 12b.

[One-Way Clutch]

Figure 3:
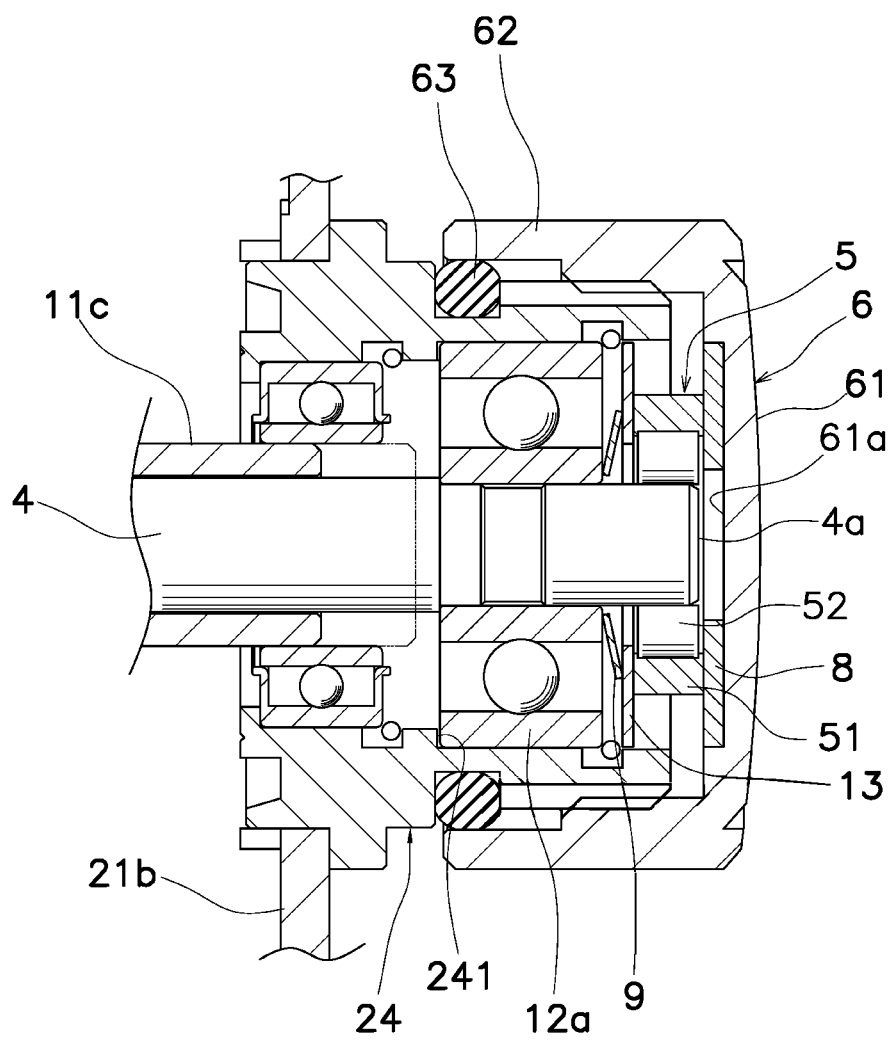
FIG. 3 is an enlarged cross-sectional view of the dual-bearing reel.

As shown in FIG. 3, the one-way clutch 5 is attached to the spool shaft 4. The one-way clutch 5 comprises an outer ring 51 and a plurality of rolling bodies 52. The outer ring 51 is rotatable with respect to the reel main body 2. In detail, the outer ring 51 is rotatable with respect to the protruding part 24. The outer ring 51 is disposed spaced apart from an inner-circumferential surface of the protruding part 24.

The outer ring 51 is interposed and held by the first friction plate 8 and a second friction plate 13 in the axial direction. That is, the rotation of the outer ring 51 is braked by the first and second friction plates 8, 13.

The rolling bodies 52 are disposed between the spool shaft 4 and the outer ring 51. The rolling bodies 52 transmit the rotation of the spool shaft 4 in the fishing line reeling-out direction to the outer ring 51. On the other hand, the rolling bodies 52 do not transmit the rotation of the spool shaft 4 in the fishing line reeling-in direction to the outer ring 51.

[Adjusting Member]

The adjusting member 6 is attached to the first reel body portion 21. The adjusting member 6 has a cylindrical shape. In detail, the adjusting member 6 comprises a disc part 61 and a second cylindrical part 62 (one example of a second tubular part), which extends from an outer-circumferential-end part of the disc part 61 in the axial direction. A screw thread is formed on an inner-circumferential surface of the adjusting member 6. The adjusting member 6 screws onto the protruding part 24 of the reel main body 2. Consequently, when the adjusting member 6 rotates about an axis of the adjusting member, the adjusting member moves in the axial direction of the spool shaft.

The adjusting member 6 can adjust the braking force with which the rotation of the spool shaft 4 is braked. Thus, the adjusting member 6 is an example of an adjusting means for adjusting a braking force with which a rotation of the spool shaft 4 is braked. It is noted that, in the present embodiment, when the spool shaft 4 rotates in the reeling-out direction, the spool shaft 4 and the outer ring 51 rotate cooperatively. Consequently, by adjusting the braking force with which the rotation of the outer ring 51 is braked, the adjusting member 6 can adjust the braking force with which the rotation of the spool shaft 4 is braked. Specifically, by causing the adjusting member 6 to rotate and thereby move in the axial direction, the adjusting member 6 can adjust the force that presses against the outer ring 51 and, in turn, can adjust the braking force with which the outer ring 51 is braked. It is noted that the adjusting member 6 presses the outer ring 51 via the first friction plate 8.

A sealing member 63 is disposed between the inner-circumferential surface of the adjusting member 6 and the outer-circumferential surface of the protruding part 24. The sealing member 63 can prevent foreign matter from penetrating the interior of the reel main body 2. In addition, the sealing member 63 imparts a rotational resistance to the adjusting member 6 such that the adjusting member 6 does not rotate against the intention of the angler.

[First Friction Plate]

The first friction plate 8 is disposed between the outer ring 51 of the one-way clutch 5 and the disc part 61 of the adjusting member 6. The first friction plate 8 is an annular plate and is in contact with the outer ring 51. It is noted that although in contact with the outer ring 51, the first friction plate 8 is not in contact with the rolling bodies 52. The first friction plate 8 is made of, for example, carbon cloth. The disc part 61 of the adjusting member 6 presses against the outer ring 51 in the axial direction via the first friction plate 8.

[Biasing Member]

The biasing member 9 biases the outer ring 51 of the one-way clutch 5 toward the disc part 61 of the adjusting member 6. That is, the biasing member 9 biases the outer ring 51 such that the outer ring 51 does not separate from the first friction plate 8. It is noted that the biasing member 9 biases the outer ring 51 via the second friction pate 13. The second friction pate 13 has an annular shape and is in contact with the outer ring 51 of the one-way clutch 5. It is noted that the second friction pate 13 is not in contact with the rolling bodies 52.

In the axial direction, movement of the biasing member 9 in the direction leading away from the one-way clutch 5 is restricted. Specifically, the biasing member 9 is supported by the first bearing member 12a. Movement of the first bearing member 12a in the direction leading away from the one-way clutch 5 is restricted by a step part 241, which is formed on the inner-circumferential surface of the protruding part 24.

The biasing member 9 is, for example, a disc spring. An outer-circumferential part of the biasing member 9 biases the outer ring 51 of the one-way clutch 5 via the second friction pate 13. In addition, an inner-circumferential part of the biasing member 9 is supported by an inner ring of the first bearing member 12a. Even when the biasing member 9 is completely compressed, an end surface 4a of the spool shaft 4 does not contact a bottom surface 61a of the adjusting member 6.

[Operation Lever]

As shown in FIG. 1, the operation lever 7 comprises an lever body portion 71, a mounting part 72, and a hinge part 73. The operation lever 7 is detachably attached to the adjusting member 6. It is noted that the operation lever 7 can be fixed to the adjusting member 6 or can be formed integrally with the adjusting member 6.

The lever body portion 71 extends from the adjusting member 6 in the radial direction. In addition, the lever body portion 71 extends toward the second reel body portion 22. Specifically, the lever body portion 71 meanders toward the second reel body portion 22. Thus, the lever body portion 71 is an example of a means for operating the operation lever 7 from the second reel body portion 22 side of the reel.

The lever body portion 71 comprises a base-end part 711 and an operation part 712. The base-end part 711 extends from the adjusting member 6 in the radial direction. In detail, the base-end part 711 extends from the mounting part 72, which is attached to the adjusting member 6, in the radial direction. The base-end part 711 extends in a stepped shape in the radial direction and the axial direction. That is, the base-end part 711 extends from the mounting part 72 in the radial direction, then extends toward the second reel body portion 22 side in the axial direction, and then once again extends in the radial direction.

The operation part 712 extends in the axial direction from a tip part of the base-end part 711 toward the second reel body portion 22. The operation part 712 is disposed on the outer side of the first reel body portion 21 in the radial direction. The operation part 712 overlaps, in a radial-direction view, an outermost-circumferential surface 211 of the first reel body portion 21 and demarcates an overlapping area R. It is noted that the outermost-circumferential surface 211 of the first reel body portion 21 is called the largest-diameter outer-circumferential surface of the outer-circumferential surface of the first reel body portion 21, centered on the spool shaft 4.

Figure 4:
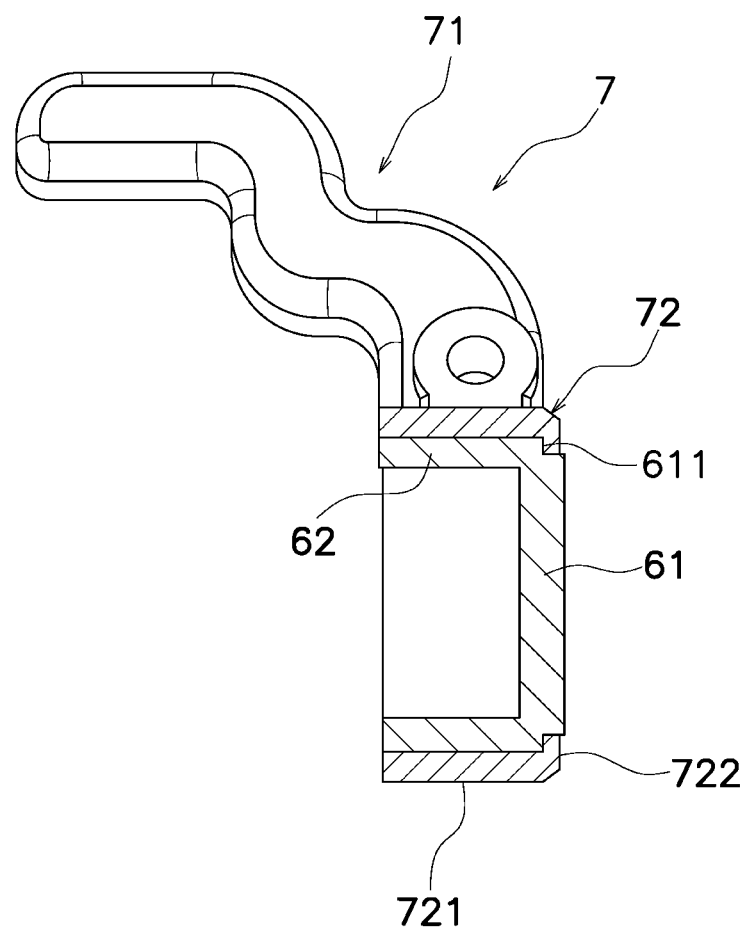
FIG. 4 is a cross-sectional view of an operation lever.

As shown in FIG. 4, the mounting part 72 is detachably attached to the adjusting member 6. The mounting part 72 comprises a first cylindrical part 721 (one example of a first tubular part) and an inner-side flange part 722. The first cylindrical part 721 is disposed on the outer side of the second cylindrical part 62 in the radial direction. The second cylindrical part 62 fits in the first cylindrical part 721. That is, an inner diameter of the first cylindrical part 721 is substantially equal to an outer diameter of the second cylindrical part 62.

The inner-side flange part 722 extends from the first cylindrical part 721 toward the inner side in the radial direction. The inner-side flange part 722 has an annular shape. The inner-side flange part 722 makes contact with the adjusting member 6 in the axial direction. In detail, the inner-side flange part 722 makes contact with the outer-circumferential-end part of the disc part 61 of the adjusting member 6. It is noted that an annular recessed part 611 is formed on the outer-circumferential-end part of the disc part 61. The inner-side flange part 722 fits in the recessed part 611. Thus, in order for the inner-side flange part 722 to make contact with the adjusting member 6, movement of the operation lever 7 toward the second reel body portion 22 side in the axial direction is restricted. Consequently, the operation lever 7 is easily positioned in the axial direction.

As shown in FIG. 1, the lever body portion 71 is capable of pivoting in the axial direction. Specifically, the lever body portion 71 is attached to the mounting part 72 via the hinge part 73. The hinge part 73 couples the lever body portion 71 and the mounting part 72 such that the lever body portion 71 pivots in the axial direction.

In addition, the operation lever 7 is detachably attached to the adjusting member 6. The position of the operation lever 7 in the circumferential direction with respect to the adjusting member 6 can be adjusted.

[Handle]

As shown in FIG. 2, the handle 10 is a member for causing the spool shaft 4 to rotate and is rotatably mounted to the first reel body portion 21. When the handle 10 rotates, the spool shaft 4 rotates via the rotation-transmitting mechanism 11.

[Rotation-Transmitting Mechanism]

The rotation-transmitting mechanism 11 is a mechanism that transmits the rotation of the handle 10 to the spool shaft 4. The rotation-transmitting mechanism 11 comprises a drive shaft 11a, a drive gear 11b, a pinion gear 11c, and a clutch mechanism 11d. The drive shaft 11a rotates integrally with the handle 10. The drive gear 11b rotates integrally with the drive shaft 11a. The pinion gear 11c meshes with the drive gear 11b. The pinion gear 11c has a tube shape, and the spool shaft 4 passes through the interior of the pinion gear 11c.

The clutch mechanism 11d is configured such that the rotation of the pinion gear 11c is transmitted to or disconnected from the spool shaft 4. Specifically, the clutch mechanism 11d comprises an engaging pin 11e and an engaging-recessed part 11f. The engaging pin 11e passes through the spool shaft 4 in the radial direction. The engaging-recessed part 11f is a recessed part that is formed in one end part of the pinion gear 11c. The rotation of the pinion gear 11c is transmitted to the spool shaft 4 by the engaging pin 11e being engaged with the engaging-recessed part 11f. On the other hand, if the engagement of the engaging pin 11e and the engaging-recessed part 11f is released by the pinion gear 11c moving in the direction leading away from the engaging pin 11e, then the rotation of the pinion gear 11c is not transmitted to the spool shaft 4.

[Operation of Dual-Bearing Reel]

Next, the operation of the dual-bearing reel 100 will be explained. When a fishing line is cast, wherein the fishing line is reeled out from the spool 3, the spool shaft 4 rotates in the reeling-out direction. The rotation of the spool shaft 4 in the reeling-out direction is transmitted to the outer ring 51 via the rolling bodies 52 of the one-way clutch 5, and thereby the outer ring 51 rotates. The outer ring 51 is pressed by the adjusting member 6 via the first friction plate 8. That is, the outer ring 51 is braked by the adjusting member 6, and consequently the rotational speed of the outer ring 51 is reduced. Because the outer ring 51 and the spool shaft 4 move cooperatively, the rotational speed of the spool shaft 4 is reduced when the line is being reeled out, and thereby backlash is prevented.

When the operation lever 7 is pivoted in the circumferential direction, the adjusting member 6 moves in the axial direction and consequently the pressing force applied by the adjusting member 6 to the outer ring 51 can be adjusted. The operation lever 7 is an example of a means for moving the adjusting member 6. That is, by pivoting the operation lever 7 in the circumferential direction, the braking force applied to the spool shaft 4 can be adjusted. It is noted that the operation lever 7 can be operated by, for example, the hand that holds the second reel body portion 22. Here, the operation lever 7 is also pivotable in the axial direction. Consequently, the position of the operation lever 7 can be adjusted based on the size of the user's hand, the position of the operation lever 7 can be adjusted based on the size of the reel main body to which the operation lever 7 is attached, and the like.

When the fishing line is to be reeled in, the spool shaft 4 is rotated in the reeling-in direction. The rolling bodies 52 do not transmit the rotation of the spool shaft 4 in the reeling-in direction to the outer ring 51. That is, the spool shaft 4 and the outer ring 51 do not move cooperatively, and therefore the braking force adjusted by the adjusting member 6 does not act upon the spool shaft 4. Accordingly, when the line is being reeled in, the rotational resistance of the adjusting member 6 does not arise at the spool shaft 4, and therefore the spool shaft 4 can rotate smoothly.

As described above, the operation lever 7 extends in the radial direction and also extends toward the second reel body portion 22. Consequently, the operation lever 7 can be operated by the hand in the state in which that hand holds the second reel body portion 22.

The text above explained one embodiment of the present disclosure, but the present disclosure is not limited to the abovementioned embodiment, and it is understood that various modifications can be effected within a scope that does not depart from the gist of the disclosure.

Modified Example 1

Figure 5:
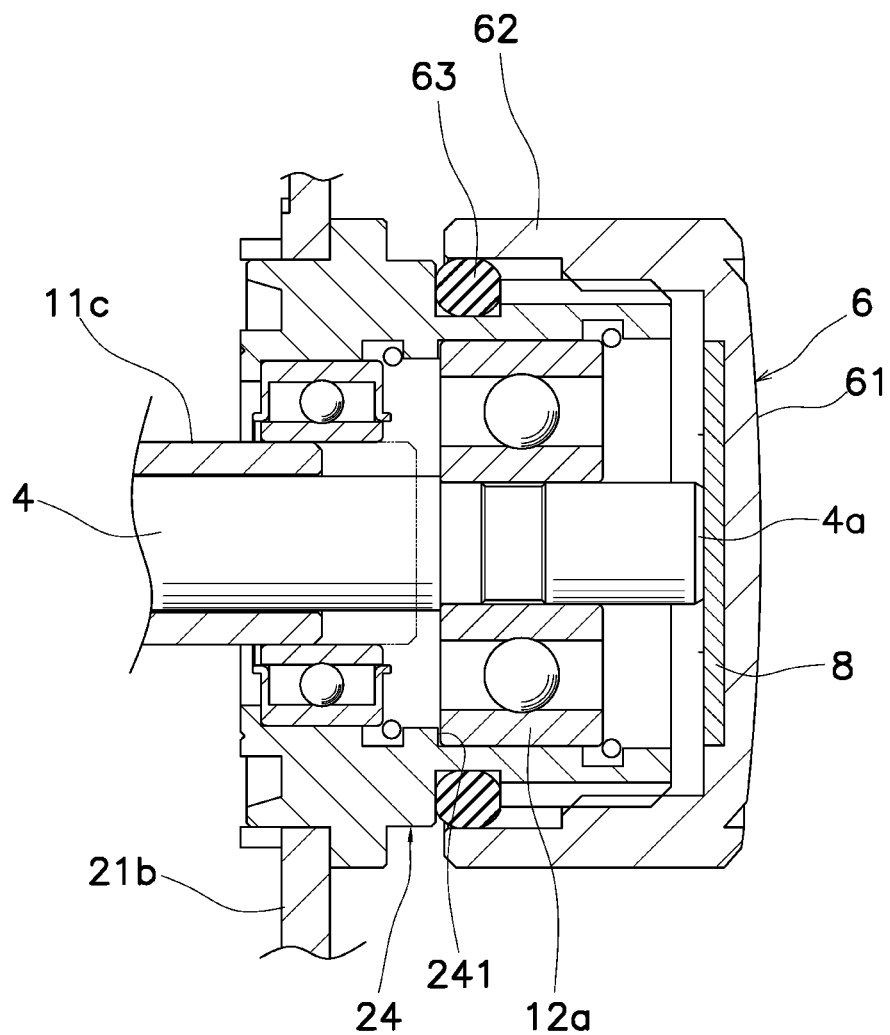
FIG. 5 is an enlarged cross-sectional view of the dual-bearing reel according to a modified example.

In the abovementioned embodiment, the adjusting member 6 brakes the rotation of the spool shaft 4 via the one-way clutch 5, but the one-way clutch 5 can be omitted and the rotation of the spool shaft 4 can be braked directly. For example, as shown in FIG. 5, the first friction plate 8 can contact the end surface 4a of the spool shaft 4.

Modified Example 2

In the abovementioned embodiment, the lever body portion 71 meanders, but the shape of the lever body portion 71 is not limited thereto; for example, the lever body portion 71 can be curved.

Modified Example 3

Figure 6:
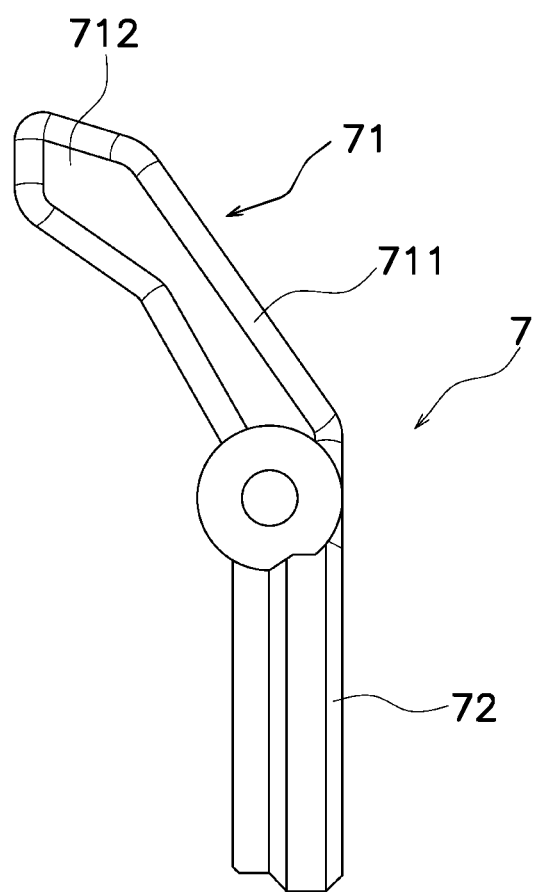
FIG. 6 is a side view of the operation lever according to the modified example.

In the abovementioned embodiment, the base-end part 711 of the lever body portion 71 extends in a stepped shape, but the shape of the base-end part 711 is not limited thereto. For example, as shown in FIG. 6, the base-end part 711 can be tilted toward the second reel body portion 22 side in the axial direction and extend in the radial direction. Furthermore, the operation part 712 extends from the tip part of the base-end part 711 toward the second reel body portion 22 side in the axial direction.

Modified Example 4

Figure 7:
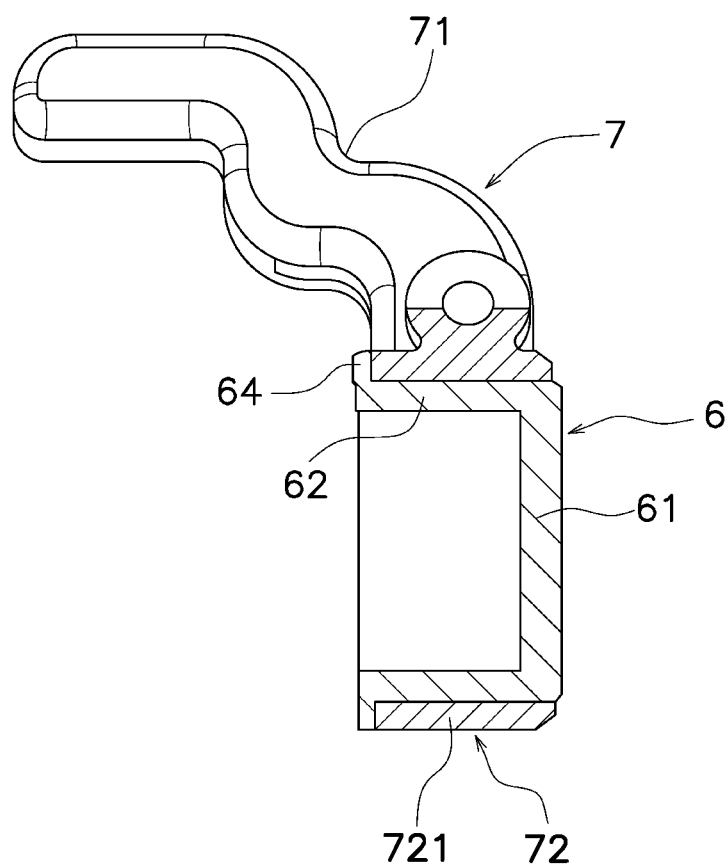
FIG. 7 is a cross-sectional view of the operation lever according to the modified example.

In the abovementioned embodiment, the operation lever 7 is positioned in the axial direction by the inner-side flange part 722 of the mounting part 72, but the present disclosure is not limited thereto. For example, as shown in FIG. 7, instead of the mounting part 72 comprising the inner-side flange part 722, the adjusting member 6 can comprise an outer-side flange part 64. The outer-side flange part 64 extends from the second cylindrical part 62 toward the outer side in the radial direction. Furthermore, the first cylindrical part 721 of the mounting part 72 makes contact with the outer-side flange part 64 in the axial direction. Thereby, movement of the operation lever 7 toward the second reel body portion 22 side in the axial direction can be restricted.

Figure 8:
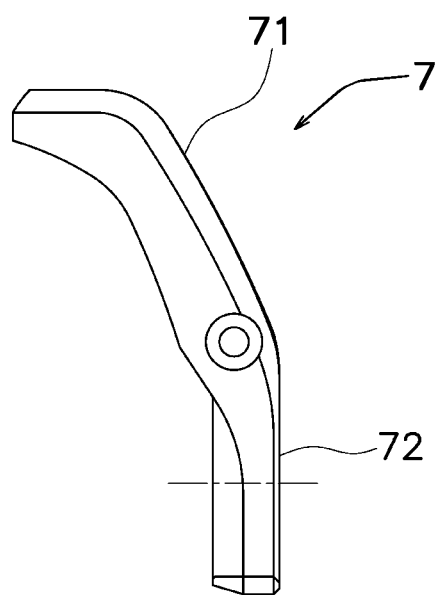
FIG. 8 is a side view of the operation lever according to the modified example.
Figure 9:
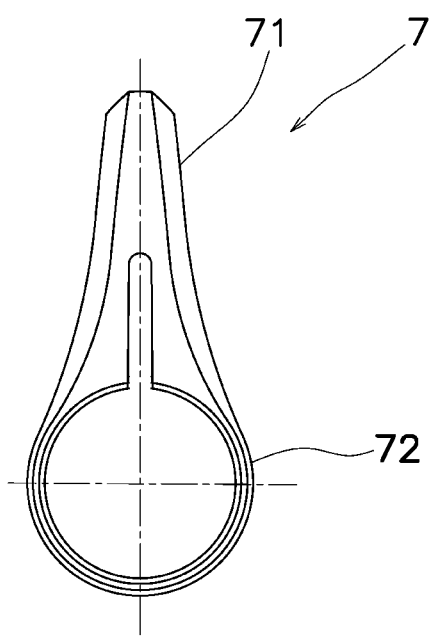
FIG. 9 is a front view of the operation lever according to the modified example.

In the abovementioned embodiment, the lever body portion 71 is attached to the mounting part 72 via the hinge part 73, but the configuration of the operation lever 7 is not limited thereto. For example, as shown in FIG. 8 and FIG. 9, the operation lever 7 does not have to comprise the hinge part. The lever body portion 71 can extend directly from the mounting part 72. That is, the lever body portion 71 and the mounting part 72 can be integrally formed.

EXPLANATION OF SYMBOLS

21 First reel body portion
22 Second reel body portion
3 Spool
4 Spool shaft
6 Adjusting member
7 Operation lever
71 Lever body portion
711 Base-end part
712 Operation part
72 Mounting part
721 First cylindrical part
722 Inner-side flange part
73 Hinge part
100 Dual-bearing reel

The invention claimed is:
1. A dual-bearing reel comprising:
a first reel body portion;
a second reel body portion spaced apart from the first reel body portion in an axial direction;
a spool disposed between the first reel body portion and the second reel body portion;
a spool shaft that rotates integrally with the spool;
an adjusting member attached to the first reel body portion for adjusting a braking force with which a rotation of the spool shaft is braked; and
an operation lever detachably attached to the adjusting member, including a lever body portion that extends from the adjusting member in a radial direction and extends toward the second reel body portion,
a position of the operation lever in a circumferential direction being adjustable with respect to the adjusting member.
2. The dual-bearing reel according to claim 1, wherein the lever body portion is pivotably attached to the adjusting member.

3. The dual-bearing reel according to claim 1, wherein the operation lever further comprises a mounting part detachably attached to the adjusting member.

4. The dual-bearing reel according to claim 3, wherein the operation lever further comprises a hinge part that couples the lever body portion and the mounting part such that the lever body portion is pivotably attached to the adjusting member.

5. The dual-bearing reel according to claim 3, wherein
the mounting part comprises a first tubular part; and
the adjusting member comprises a second tubular part that fits in the first tubular part.

6. The dual-bearing reel according to claim 5, wherein the mounting part comprises an inner-side flange part that extends from the first tubular part toward an inner side and makes contact with the adjusting member in the axial direction.

7. The dual-bearing reel according to claim 5, wherein
the adjusting member further comprises an outer-side flange part that extends from the second tubular part toward an outer side; and
the first tubular part makes contact with the outer-side flange part in the axial direction.

8. The dual-bearing reel according to claim 1, wherein a tip part of the lever body portion overlaps with an outermost-circumferential surface of the first reel body portion in a radial-direction view.

9. The dual-bearing reel according to claim 1, wherein the lever body portion meanders or curves toward the second reel body portion.

10. The dual-bearing reel according to claim 1, wherein the lever body portion comprises:

a base-end part extending from the adjusting member in the radial direction; and an operation part extending from a tip part of the base-end part toward the second reel body portion in the axial direction.

11. The dual-bearing reel according to claim 10, wherein the operation part is disposed on an outer side of the first reel body portion in the radial direction.

12. The dual-bearing reel according to claim 10, wherein the base-end part extends in a stepped shape in the radial direction and the axial direction.

13. The dual-bearing reel according to claim 10, wherein the base-end part extends to be tilted relative to the radial direction toward the second reel body portion.

14. The dual-bearing reel according to claim 10, wherein a width of the operation part is larger than a width of the base-end part.

* * * * *